United States Patent
Kim et al.

(10) Patent No.: US 7,428,405 B2
(45) Date of Patent: Sep. 23, 2008

(54) AUTOMATIC OPERATION SYSTEM AND METHOD FOR AUTOMATING SATELLITE CONTROL OPERATION AND SATELLITE GROUND CONTROL SYSTEM USING THE SAME

(75) Inventors: In-Jun Kim, Daejon (KR); Jae-Hoon Kim, Daejon (KR)

(73) Assignee: Electronics and Telecommunications Research Institute (KR)

( * ) Notice: Subject to any disclaimer, the term of this patent is extended or adjusted under 35 U.S.C. 154(b) by 644 days.

(21) Appl. No.: 11/156,357

(22) Filed: Jun. 16, 2005

(65) Prior Publication Data

US 2006/0100752 A1 May 11, 2006

(30) Foreign Application Priority Data

Nov. 11, 2004 (KR) ............... 10-2004-0091936

(51) Int. Cl.
*H04B 7/185* (2006.01)
(52) U.S. Cl. .............. 455/12.1; 455/427; 455/430; 455/98; 342/356; 342/357.17; 701/13; 701/226
(58) Field of Classification Search ............ 455/3.02, 455/3.03, 12.1, 14, 11.1, 13.1, 98, 427, 430, 455/431; 342/357.06, 352, 356, 357.11, 342/355, 357.07, 357.17, 357.08; 701/13, 701/226, 24, 42, 51, 60
See application file for complete search history.

(56) References Cited

U.S. PATENT DOCUMENTS

| | | | |
|---|---|---|---|
| 5,721,810 A | | 2/1998 | Hahn et al. |
| 5,951,609 A | | 9/1999 | Hanson et al. |
| 6,463,260 B1 | * | 10/2002 | Nagai ...................... 455/12.1 |
| 6,484,028 B2 | * | 11/2002 | Okada et al. ................ 455/428 |
| 6,597,892 B1 | * | 7/2003 | Caldwell et al. ........... 455/12.1 |
| 6,694,253 B2 | * | 2/2004 | Schroeder ................... 701/208 |
| 6,816,705 B1 | * | 11/2004 | Quan et al. ................ 455/12.1 |
| 6,915,238 B2 | * | 7/2005 | Watts et al. ................ 702/188 |
| 2003/0098810 A1 | * | 5/2003 | Lee et al. ............... 342/357.06 |
| 2006/0136103 A1 | * | 6/2006 | Lee et al. ..................... 701/13 |

FOREIGN PATENT DOCUMENTS

KR 100204051 3/1999

* cited by examiner

*Primary Examiner*—Sujatha Sharma
(74) *Attorney, Agent, or Firm*—Blakely, Sokoloff, taylor & Zafman

(57) ABSTRACT

Provided are an automatic operation system for automating satellite control operation, a method thereof, and an automatic satellite ground control system using the same. The object of the present research is to provide an automatic operation system that can reduce operation manpower and cost by automatically operating an entire satellite ground control system, which requires a plurality of operators to be properly operated, all the times, a method thereof, and an automatic satellite ground control system using the same. The satellite ground control system of the present research includes: a mission timeline receiving unit, an operation procedure editing unit, an operation procedure analyzing and code transforming unit, an operation procedure executing unit, a subsystem process state monitoring unit, and an access managing unit for providing interface with each of the subsystems.

12 Claims, 6 Drawing Sheets

AUTOMATIC OPERATION SYSTEM AND METHOD FOR AUTOMATING SATELLITE CONTROL OPERATION AND SATELLITE GROUND CONTROL SYSTEM USING THE SAME

FIELD OF THE INVENTION

The present invention relates to an automatic operation apparatus for automating satellite control operation, a method thereof, and an automatic satellite control system using the same. More particularly, the present invention relates to an Automatic Operation System (AOS) that can automate the operation of an entire satellite ground control system by automating the operation of software modules included in subsystems that constitute the satellite ground control system, a method thereof, and an automatic satellite ground control system using the automatic operation system.

DESCRIPTION OF RELATED ART

Due to broad coverage of a satellite, diverse services are provided by using a satellite through out the world. For example, satellites are widely used in such areas as communication, observation, meteorology, navigation, espionage, and scientific experiments. To operate the satellites, a satellite ground control system for monitoring and controlling the state of the satellites on the earth are needed as well as experts for operating the system. Since a satellite is operated for a minimum of 2 to 3 years and a maximum of over 15 years, the satellite ground control system should be able to be operated as long as the satellite works. For this reason, it takes more money to operate the satellite ground control system than to manufacture the satellite ground control system itself generally.

Recently, the satellite ground control system becomes lightweight to reduce the operation cost and it tends to be manufactured by using inexpensive hardware and open-source software. Also, in order to reduce the operation cost, the satellite ground control system is manufactured to be operated with a minimum of manpower.

Hereinafter, the structure and functions of a conventional satellite ground control system will be described with reference to FIG. 1.

FIG. 1 is a block diagram showing a conventional satellite control system. As shown, the conventional satellite ground control system includes: a flight dynamics subsystem (FDS) 11, a mission planning subsystem (MPS) 12, a real-time operations subsystem (ROS) 13, a hybrid simulator subsystem (HSS) 14, a telemetry, tracking and command subsystem (TTC) 15, and a telecommand database (DB) 16. When the mission planning subsystem 12 transmits a mission scheduling result to the real-time operations subsystem 13 upon receipt of a mission execution request from a user and event estimation information estimated in the flight dynamics subsystem 11, the real-time operations subsystem 13 transforms the mission scheduling result into telecommand codes and transmits them to the hybrid simulator subsystem 14 or the TTC 15.

Herein, the telecommand codes transmitted from the real-time operations subsystem 13 to the hybrid simulator subsystem 14 are used to verify a telecommand by monitoring if telemetered data are changed by the telecommand, before the telecommand codes are directly transmitted to the satellite. In addition, the transmission of telecommand codes to the TTC 15 is a substantial satellite operation activity for directly transmitting a telecommand to the satellite through the TTC 15.

The satellite ground control system requires many operators, because all the procedures, such as operating software modules that perform the functions of subsystems, transmitting output results from the software modules to another subsystem, and checking, should be executed by the operators in the satellite ground control system. Generally, the satellite ground control system is capable of controlling only one satellite.

Among recent studies for manufacturing the satellite ground control system is an attempt to automate the operation of the satellite ground control system by using a satellite operation knowledge base. It stores the state of the telemetered data that reacts to the telecommands in a knowledge base and, if a problem out of the rule occurs, it automatically transmits a telecommand to solve the problem. However, the satellite ground control system may be able to cope with a special circumstance such as system abnormality effectively, but it still has the above mentioned problems in its regular system operation. Therefore, it is hard to acquire the effects of reduced manpower and operation cost substantially or an effect of multi-satellite monitoring.

In order to control a satellite in the satellite ground control system and method of FIG. 1, manpower with expertise should be disposed to each subsystem to control the satellite. Also, well-trained operators are needed to reduce errors in the operation of the satellite ground control system, but a chance that the operators make an error still exist.

In a case of a low earth orbit satellite which has a short access time with the ground, the access with the satellite should be completed within a few minutes. Otherwise, the operator should wait for a long time for the next contact with the satellite. Thus, there are chances that a problem may occur when the satellite ground control system and method of FIG. 1 perform the satellite control within a short time. Particularly, in order to control a plurality of satellites simultaneously, each satellite needs the satellite-specific ground control system individually and the control should be operated independently. In this case, the operation cost is increased remarkably as well as the system developing cost.

Related to the present invention is U.S. Pat. No. 5,721,810 granted on Feb. 24, 1998, which will be referred to as a reference 1 hereinafter, entitled "Method of automatically controlling and verifying telecommands in satellite control system."

When the reference 1 is compared to the present invention, it can be figured out that the reference 1 aims for reducing a burden of checking whether there is an error caused by the transmission of a telecommand, while the present invention aims for automation of constant operation of subsystems that constitute the satellite ground control system without regard to the presence of an error.

Also, while the reference 1 analyzes a telemetered value for a telecommand based on the satellite operation knowledge base and automatically copes with an error, the present invention has an automatic operation system connected to the subsystems of the satellite ground control system, authors a script for the entire system operation procedures, i.e., an automatic operation procedure script, and operates automatically based on the automatic operation procedure script.

Therefore, the cited reference 1 has an effect that it can deal with an error automatically without any involvement of an operator by automatically detecting and coping with an error. On the other hand, the present invention not only brings about an effect similar to the effect of the reference 1 by establishing conditions based on the generation of abnormalities and authoring a script on countermeasures thereto and operating the satellite ground control system based on the script, but also it can reduce the operation cost and manpower by automating the entire satellite ground control system including the transmission of telecommands.

Another reference related to the present invention is Korean Patent No. 10-0204051 granted on Mar. 25, 1999, which will be referred to as a reference 2, entitled "Remote reservation and automatic operation apparatus and method for transmitting telecommand to satellite."

However, when compared to the present invention, the cited reference 2 aims for automating the transmission of a telecommand by defining a telecommand procedure, which is a set of telecommands, and registering the telecommands in a reservation table. On the other hand, the object of the present invention lies in the automation of the entire satellite ground control system based on the use of the automatic operation system by controlling the operations of the subsystems that constitute the satellite ground control system as well as automation of telecommand transmission.

To achieve the objects, the reference 2 defines a telecommand execution procedure in a temporal order, puts the telecommands, which used to be selected and transmitted by an operator one by one, in the reservation table, and makes the telecommands executed automatically at corresponding time. On the other hand, the present invention, which is provided with the automatic operation system linked with the subsystems of the satellite ground control system, authors a script on the operation procedures of the entire satellite ground control system that controls software modules of the subsystems, and operates the satellite ground control system based on the script. In short, the reference 2 has a structure for executing the telecommands automatically, whereas the present invention has a structure for operating the satellite ground control system automatically.

Therefore, while the reference 2 has an effect of transmitting the telecommands automatically and stably based on the temporal procedures, the present invention can reduce the operation cost and manpower remarkably by automating the entire satellite ground control system as well as the transmission of the telecommands.

Yet another prior art related to the present invention is U.S. Pat. No. 5,951,609 granted on Sep. 14, 1999, which will be referred to as a reference 3 hereinafter, entitled "Method and system for automatic spacecraft control."

When compared to the present invention, the cited reference 3 aims for performing the automatic operation in a satellite, while the present invention aims for increased operation efficiency by performing automatic operation in the satellite ground control system.

To achieve the objects, the reference 3 realizes the automatic operation of the satellite by providing functions of mission planning and error detection, restoration, and command execution to the satellite. On the other hand, the present invention, which is provided with the automatic operation system connected to the subsystems of the satellite ground control system, authors a script on the operation procedure of the entire satellite ground control system for controlling the software modules of the subsystems and makes the satellite ground control system operated based on the script.

Therefore, the reference 3 simplifies the satellite ground control system by adding functions to the satellite and making the telecommands executed automatically upon a mission request or error occurrence, whereas the present invention increases the operation efficiency by automating the satellite ground control system without changing the satellite.

SUMMARY OF THE INVENTION

It is, therefore, an object of the present invention to provide an automatic operation system and method for reducing operation manpower and cost by automatically operating an entire satellite ground control system that is operated by a plurality of operators, and an automatic satellite ground control system using the same.

The above and other objects and features of the present invention will become apparent from the following description of the preferred embodiments. Also, it can be easily understood that the objects and advantages of the present invention can be realized by the means as claimed and combinations thereof.

In accordance with an aspect of the present invention, there is provided an automatic satellite ground control system for automating satellite control, which includes: a mission timeline receiving unit for receiving a mission timeline; an operation procedure editing unit for authoring an operation procedure script for remotely controlling subsystems based on a process state of a software module of each subsystem for satellite operation by being informed from the mission timeline receiving unit that the mission timeline is received and inquiring into an automatic operation procedure script database; an operation procedure analyzing and code transforming unit for analyzing an automatic operation procedure of the operation procedure script and transforming the automatic operation procedure and telecommands into execution codes based on a telecommand database; an operation procedure executing unit for transmitting automatic control commands to subsystems and remotely operating the automatic control commands based on time and execution conditions specified in the automatic operation procedure which is transformed into the execution codes; a subsystem process state monitoring unit for monitoring the process state of a software module of a subsystem to be controlled based on the automatic operation procedure, providing information related to selection of the subsystem that can be used for automatic control to the operation procedure editing unit, collecting state information on the state of the automatic operation procedure executed in software modules of the subsystems, and providing the state information to the operation procedure executing unit; and an access managing unit for providing interface with each of the subsystems.

In accordance with another aspect of the present invention, there is provided a method for automating operation of a satellite ground control system, the method which includes the steps of: a) receiving a mission timeline, authoring an operation procedure script for remotely controlling subsystems based on the process operation state of a software module of each subsystem for operating a satellite by inquiring into an automatic operation procedure script database; b) analyzing an automatic operation procedure of the operation procedure script and transforming the automatic operation procedure and telecommands into execution codes; c) transmitting automatic control commands to subsystems and remotely operating the automatic control commands based on time and execution conditions specified in the automatic operation procedure which is transformed into the execution codes; and d) monitoring execution state of the automatic operation procedure.

In accordance with another aspect of the present invention, there is provided a satellite controlling ground system, which includes: a flight dynamics subsystem (FDS) for estimating an event generated in operation of a satellite by estimating a change in an orbit and position of the satellite; a mission planning subsystem (MPS) for generating a conflict-free mission timeline upon receipt of an event estimated in the FDS and a mission execution request from the satellite; a real-time operations subsystem (ROS) for transmitting telecommands to the satellite and receiving telemetry from the satellite; a hybrid simulator subsystem (HSS) for describing a change in the orbit and position of the satellite based on a scenario and describing a response of the satellite with respect to the telecommands and related telemetry; a telemetry, tracking and command subsystem (TTC) for directly communicating with the satellite wirelessly through a satellite antenna by modulating or demodulating a signal; and an automatic operation system (AOS) for monitoring operation state of the ROS, the HSS and the TTC, authoring an automatic operation procedure script, automatically operating a subsystem corresponding to the automatic operation procedure script, and transmitting a telecommand.

The technology of the present invention is derived to automate the operation of the entire satellite control system to automate a process of transmitting a telecommand from a satellite ground control system to a satellite. The technology monitors the operation of subsystems, minimizes manpower required to operate the satellite ground control system by automating the operation of the subsystems needed to transmit the telecommand with an automatic operation system (AOS) which controls the operation of software of the subsystems, and reduces errors caused by an unskilled operator. In particular, it defines a logical system operation by authoring an automatic operation procedure script for satellite operation automation, and builds up a multi-satellite ground control system at a minimum of effort and cost by operating a plurality of automatic operation procedure scripts independently.

In short, the present invention automates the operations of software modules included in the subsystems that constitute the satellite ground control system to automate the operation of the satellite ground control system. It links the subsystems based on the automatic operation system for automating the operation of the entire satellite ground control system, and the automatic operation system monitors the subsystems needed for real-time processing, i.e., the TTC, the real-time operation subsystem, and the hybrid simulator subsystem, to thereby find out an appropriate combination of the subsystems, authors an operation procedure script that describes an automatic operation procedure in the automatic operation system, and operates the subsystems and transmits the telecommands based on the operation procedure script. Specifically, the technology of the present invention forms the satellite ground control system efficiently by using a plurality of operation procedure scripts according to combinations of the subsystems to thereby operate a plurality of satellites.

As described above, the present invention additionally includes an automatic operation system to automatically operate the subsystems, which includes the TTC, the real-time operations subsystem, and the hybrid simulator subsystem. The automatic operation system authors an automatic operation procedure script and operates the subsystems based on the automatic operation procedure script. The automatic operation system has a function of bringing on an automatic operation procedure from the automatic operation procedure script database and storing an authored automatic operation procedure script in the database, a function of adding a mission timeline generated in the mission planning subsystem to the authored automatic operation procedure script, and a function of transforming telecommands defined in the mission timeline into execution codes based on a telecommand database.

In accordance with the present invention, the entire satellite ground control system can be automated by connecting the subsystems that constitute the satellite ground control system, collecting information on the operation states and general state of the subsystems to thereby control the satellite by using available subsystems, and operating the software modules of the subsystems in an order defined in the automatic operation procedure script which is pre-authored and called from the automatic operation procedure script database or authored directly in the automatic operation system. This way, the involvement of an operator in the satellite control can be minimized as well as the required number of satellite operation specialists. Also, the technology of the present invention can prevent mistakes made by the operators and it can control the satellite flawlessly even during a short satellite communication time. It is also possible to automatically operate multiple satellites, which are blasted off in series and perform similar functions and missions, in one satellite ground control system by adding equipment, software or a subsystem which is needed to operate a newly launched satellite to the automatic operation system, authoring an automatic operation procedure script for the new satellite in the automatic operation system, and operate the new satellite based on the authored automatic operation procedure to control multiple satellites that are blasted off.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE INVENTION

Other objects and aspects of the invention will become apparent from the following description of the embodiments with reference to the accompanying drawings, which is set forth hereinafter. Thus, the technological concept of the present invention will be realized by those skilled in the art of the present invention. Also, if it is determined that detailed description on a prior art may blur the points of the present invention, the description will not be provided herein. Hereinafter, a preferred embodiment of the present invention will be described in detail with reference to the accompanying drawings.

Figure 1:
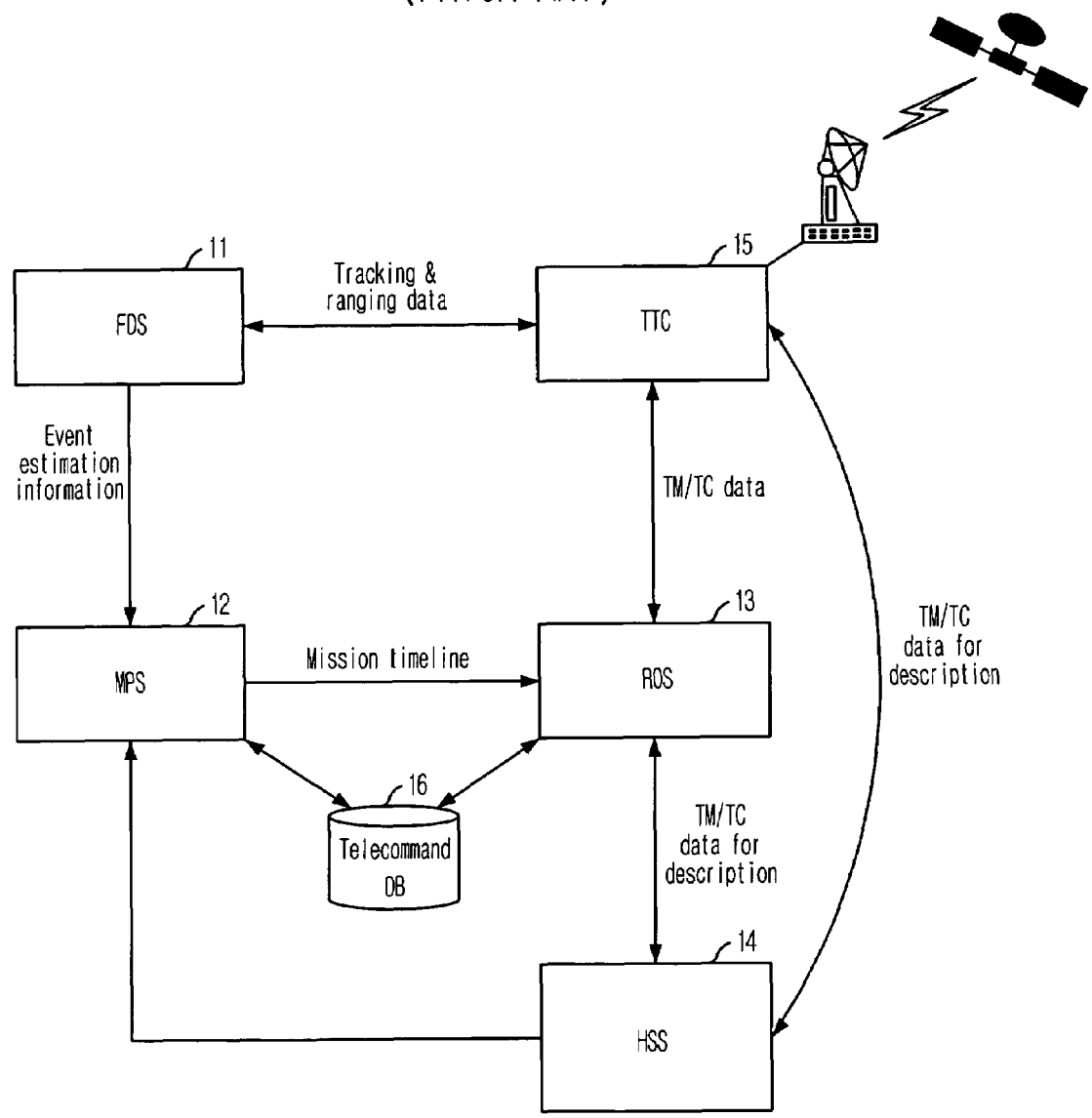
FIG. 1 is a block diagram showing a conventional satellite ground control system.
Figure 2:
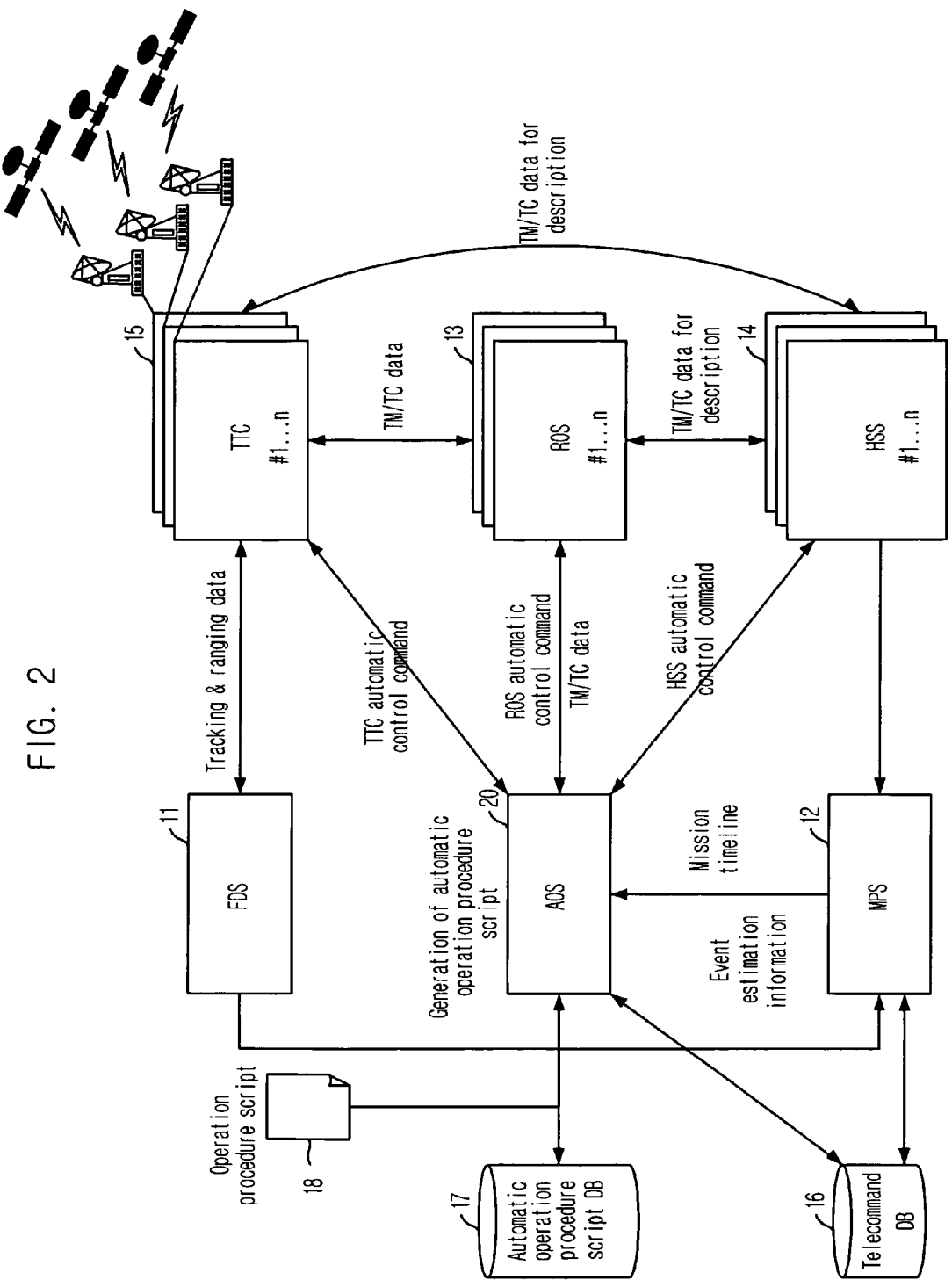
FIG. 2 is a block diagram illustrating an automatic satellite ground control system in accordance with an embodiment of the present invention.

FIG. 2 is a block diagram illustrating an automatic satellite ground control system in accordance with an embodiment of the present invention. As shown, the automatic satellite ground control system of the present invention includes: a flight dynamics subsystem (FDS) 11, a mission planning subsystem (MPS) 12, a real-time operations subsystem (ROS) 13, a hybrid simulator subsystem (HSS) 14, a telemetry, tracking and command subsystem (TTC) 15, and an automatic operation system (AOS) 20. The flight dynamics subsystem 11 estimates an event generated in a satellite by estimating a change in the orbit and posture of the satellite. The mission planning subsystem 12 generates a conflict-free mission timeline upon receipt of the event estimated in the flight dynamics subsystem 11 and a satellite mission execution request. The real-time operations subsystem 13 transmits a telecommand to the satellite and receives telemetry from the satellite. The hybrid simulator subsystem 14 describes the change in the orbit and posture of the satellite based on a scenario and describes a response to the telecommand from the satellite and related telemetry. The TTC 15 modulates and demodulates a signal to directly communicate with the satellite through a satellite antenna. The automatic operation system 20 monitors the real-time operations subsystem 13, the hybrid simulator subsystem 14, the TTC 15, 13 authors the automatic operation procedure script, and transmits the telecommands by operating the corresponding subsystems automatically.

The mission planning subsystem 12 generates a conflict-free mission timeline by receiving event estimation information from the flight dynamics subsystem 11 and the satellite mission execution request and using resources of the satellite, such as a memory, fuel, and power.

The automatic operation system 20 authors the automatic operation procedure script 18 and automatically operates the related subsystems based on the automatic operation procedure script 18. Herein, the automatic operation system 20 brings in the automatic operation procedure from an automatic operation procedure script database (DB) 17, stores an authored operation procedure script 18 in the automatic operation procedure script database 17, adds the mission timeline generated in the mission planning subsystem 12 to the authored automatic operation procedure script 18, and transfers the telecommands defined in the mission timeline into execution codes, which can be executed, by searching the telecommand database 16.

Herein, the automatic operation system 20 can operate the satellite ground control system without involvement of an operator by receiving a satellite mission timeline from the mission planning subsystem 12 to operate the satellite ground control system automatically, interfacing with the real-time operations subsystem 13, which is a subsystem related to a real-time process, the hybrid simulator subsystem 14, and the TTC 15 and collecting information on the operation state of the software modules in these subsystems, and transmitting an automatic operation control command and telecommand data to the software modules. The automatic operation procedure script database 17 stores a pre-authored automatic operation procedure script 18 which is pre-authored based on an operation scenario. The automatic operation procedure script 18 can be called and reused by the automatic operation system 20.

Figure 3:
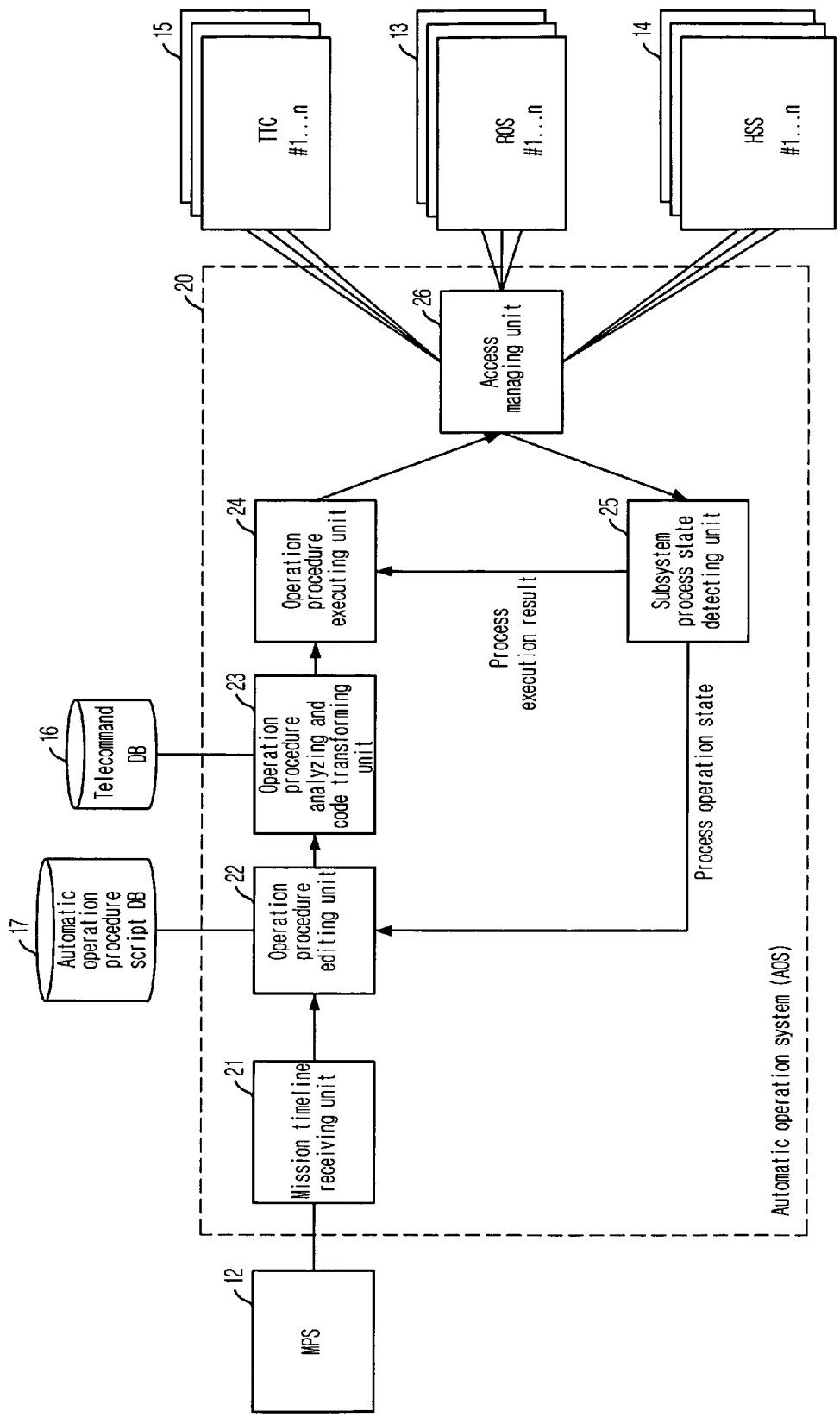
FIG. 3 is a block diagram describing an automatic operation system of FIG. 2 in accordance with an embodiment of the present invention.

FIG. 3 is a block diagram describing an automatic operation system of FIG. 2 in accordance with an embodiment of the present invention.

As shown, the automatic operation system 20 includes a mission timeline receiving unit 21, an operation procedure editing unit 22, an operation procedure analyzing and code transforming unit 23, an operation procedure executing unit 24, a subsystem process state detecting unit 25, and an access managing unit 26. The mission timeline receiving unit 21 receives a mission timeline. The operation procedure editing unit 22 is informed by the mission timeline receiving unit 21 of the receipt of the mission timeline, inquires into the automatic operation procedure script database 17, and authors an operation procedure script for controlling the subsystems 13 to 15 based on the automatic operation state of software module process of each system for operating satellite control. The operation procedure analyzing and code transforming unit 23 analyzes the automatic operation procedures of the authored operation procedure script, inquires into the telecommand database 16, and transforms the automatic operation procedure and the telecommand into execution codes. The operation procedure executing unit 24 transmits automatic control commands to the subsystems 13 to 15 and remotely operates them based on time and execution conditions specified in the automatic operation procedure which is transformed into the execution codes. The subsystem process state detecting unit 25 monitors the process state of the software modules in the subsystems 13 to 15 to be controlled based on the automatic operation procedure, provides to the operation procedure editing unit 22 information related to the selection of subsystems that are available for automatic operation among the subsystems 13 to 15, and collects and provides state information of the software modules of the subsystems 13 to 15 to the operation procedure executing unit 24. The access managing unit 26 provides interface with the subsystems 13 to 15 for operation of the satellite control.

The operation procedure editing unit 22 inquires into the automatic operation procedure script database 17 and authors the automatic operation procedure script for controlling the software modules of the real-time operations subsystem 13, the hybrid simulator subsystem 14, and the TTC 15 by using a graphic processing language. Herein, it authors the automatic operation procedure script by receiving information on the operation state of the software module of the subsystems 13 to 15 from the subsystem process state detecting unit 25.

To have a look at the process of authoring the automatic operation procedure script in the operation procedure editing unit 22, the operation procedure editing unit 22 selects a subsystem to be automatically operated among the subsystems 13 to 15 by checking operability in the subsystem process state detecting unit 25, makes a link with the software module of the selected subsystem 13, 14 or 15 through the access managing unit 26, initializes the software module of the linked subsystem 13, 14 or 15 to operate it based on the automatic operation procedure script, and executes a telecommand generated according to the mission timeline. If the telecommand is executed normally, the link with the subsystem 13, 14 or 15 is cut off and the execution of the automatic operation procedure script is completed.

The operation procedure analyzing and code transforming unit 23 inquires into the telecommand database 16 and compiles the automatic operation procedure script which is authored in the graphic processing language and a telecommand list of the mission timeline into binary codes to transform the telecommands into execution codes. In short, the operation procedure analyzing and code transforming unit 23 perform compilation to transform the automatic operation procedure script which is authored in the graphic processing language and the telecommand list of the mission timeline into execution codes.

The subsystem process state detecting unit 25 monitors waiting, execution, and error states of all software processes in the real-time operations subsystem 13, the hybrid simulator subsystem 14, and the TTS 15, and monitors the state of hardware equipment that constitutes the TTC 15.

Therefore, the subsystem process state detecting unit 25 monitors the process state of the software modules in a subsystem 13, 14 or 15 to be operated based on the automatic operation procedure, provides the information related to the selection of an available subsystem among the subsystems 13, 14 and 15 to the operation procedure editing unit 22, collects information on the state of the automatic operation procedure performed in the software modules of the subsystems 13, 14 and 15 by the operation procedure executing unit 24, provides the state information to the operation procedure executing unit 24 to thereby provide information for determining whether to complete, continue or halt the execution of the automatic operation procedure.

Figure 4:
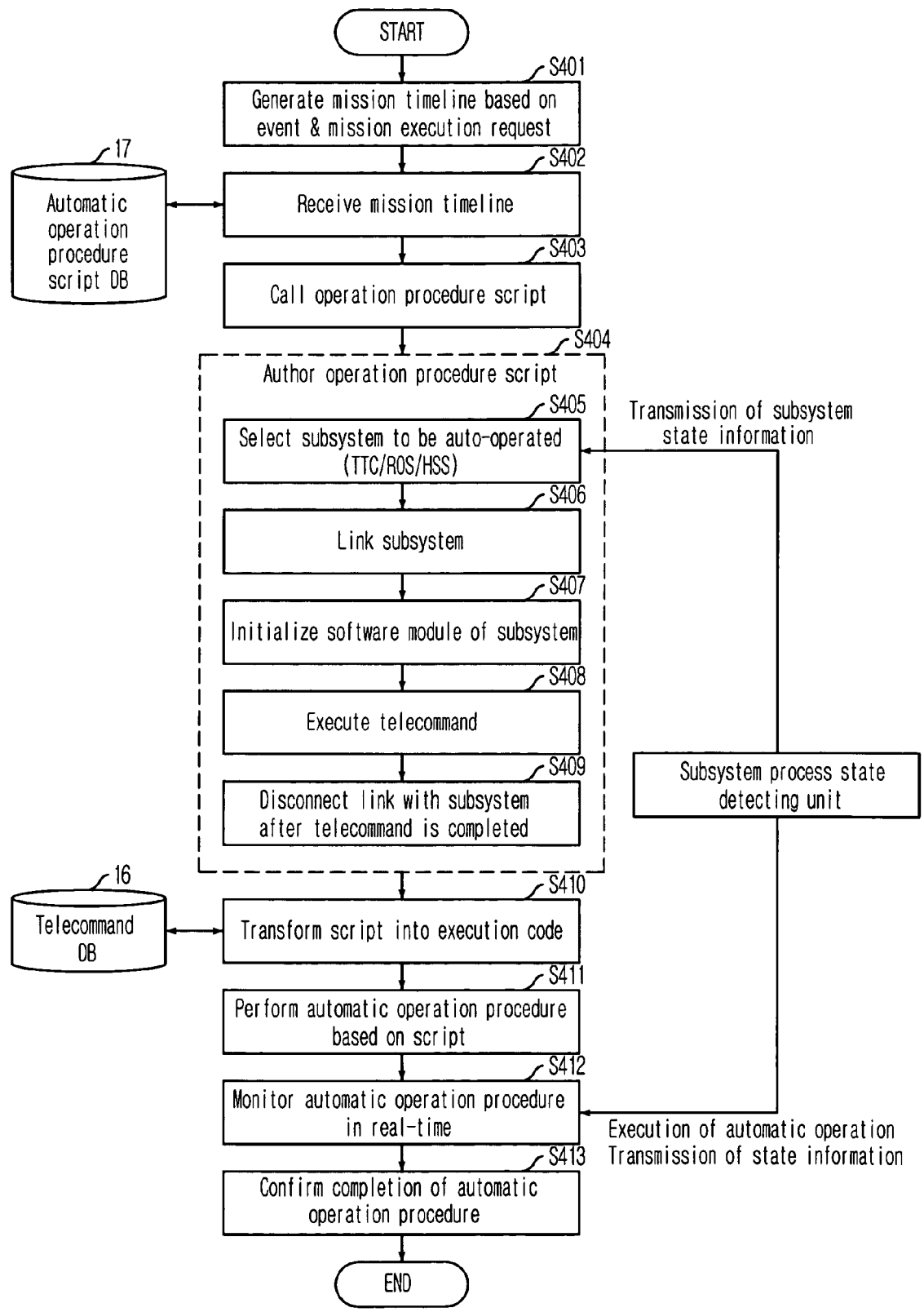
FIG. 4 is a flowchart describing an automatic operation method for automating satellite control operation in accordance with an embodiment of the present invention.

FIG. 4 is a flowchart describing an automatic operation method for automating satellite control operation in accordance with an embodiment of the present invention. It shows a process for processing the automatic operation procedure script and how to author the automatic operation procedure script.

First, at step S401, the mission planning subsystem 12 receives event information estimated in the flight dynamics subsystem 11 and a mission execution request from the satellite and generates a conflict-free mission timeline.

Subsequently, when the mission timeline receiving unit 21 receives the mission timeline from the mission planning subsystem 12 at step S402, the automatic operation system 20 calls a pre-authored operation procedure script from the automatic operation procedure script database 17 at step S403, and authors a script for remotely controlling the subsystems 13 to 15 in the graphic processing language at step S404. In short, an automatic operation procedure script for controlling the software modules used in the real-time operations subsystem 13, the hybrid simulator subsystem 14, and the TTC 15 is authored in the graphic processing language based on the automatic operation procedure script database 17. The process of authoring the automatic operation procedure script of the step S404 will be described in detail hereafter.

Subsequently, at step S410, the operation procedure analyzing and code transforming unit 23 transforms the automatic operation procedure script authored in the graphic processing language in the operation procedure editing unit 22 into execution codes, and the telecommands defined in the mission timeline are also transformed into execution codes based on the telecommand database 16. The automatic operation procedure script authored in the graphic processing language and the telecommand list of the mission timeline are compiled to be transformed into the execution codes based on the telecommand database 16.

At step S411, the operation procedure executing unit 24 executes the telecommands by handling the software modules of the subsystems 13 to 15 based on the procedure defined in the automatic operation procedure script which is transformed into the execution codes. That is, it remotely operates the real-time operations subsystem 13, the hybrid simulator subsystem 14, and the TTC 15 based on the execution codes obtained from the transformations.

Subsequently, at step S412, it is checked out whether the execution of the automatic operation procedure at the step S411 is successful based on the execution process monitoring information transmitted from the subsystem process state detecting unit 25.

Also, at step S413, the subsystem process state detecting unit 25 can confirm that all automatic operation procedure is completed.

To have a look at the process of authoring the automatic operation procedure script, a subsystem 13, 14 or 15 to be automatically operated is selected at step S405 by checking out operability in the subsystem process state detecting unit 25. At step S406, a link is made with the software module of the selected subsystem 13, 14 or 15 through the access managing unit 26. Then, at step S407, the software module of the linked subsystem 13, 14 or 15 is initialized to be operated based on the automatic operation procedure script. At step S408, the telecommands generated based on the mission timeline are executed. Herein, when the execution of the telecommands is completed normally, at step S409, the link with the selected subsystem 13, 14 or 15 is disconnected and the execution of the automatic operation procedure script is completed.

Figure 5:
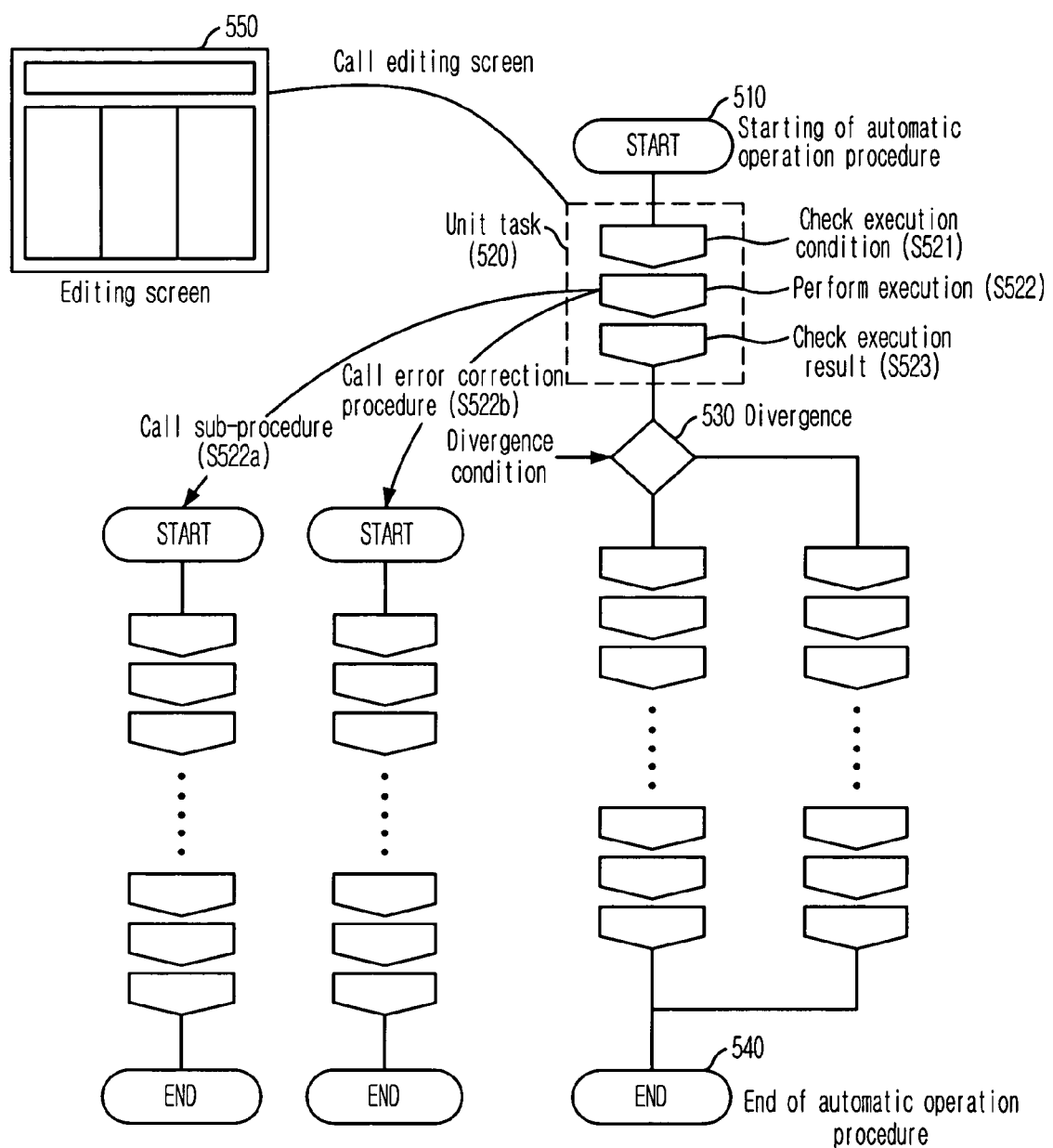
FIG. 5 is an exemplary diagram illustrating an automatic operation procedure script authoring tool, i.e., a graphic processing language, which is used in the present invention.

FIG. 5 is an exemplary diagram illustrating an automatic operation procedure script authoring tool, i.e., a graphic processing language, which is used in the present invention.

The graphic processing language is needed to author the automatic operation procedure script easily. It helps to author a task intuitively according to the operation procedure and to check the process of the automatic operation procedure at a look.

As illustrated in FIG. 5, the graphic processing language includes four large parts: Starting of the automatic operation procedure (510), a unit task to be executed (520), divergence based on divergence conditions (530), and end of the automatic operation procedure (540).

To be specific, the unit task includes the steps of checking execution time and execution conditions of the unit task at step S521; executing a task defining an activity of the unit task at step S522; and checking an execution result at step S523.

Herein, in the task execution of the step S522, a sub-operation procedure of a step S522*a* can be called. If an error occurs, a step S522*b* is carried out to correct the error.

When an icon of the unit task 520 is clicked, an editing screen for specifically defining the task is called and the user can describe detailed work operation.

Figure 6:
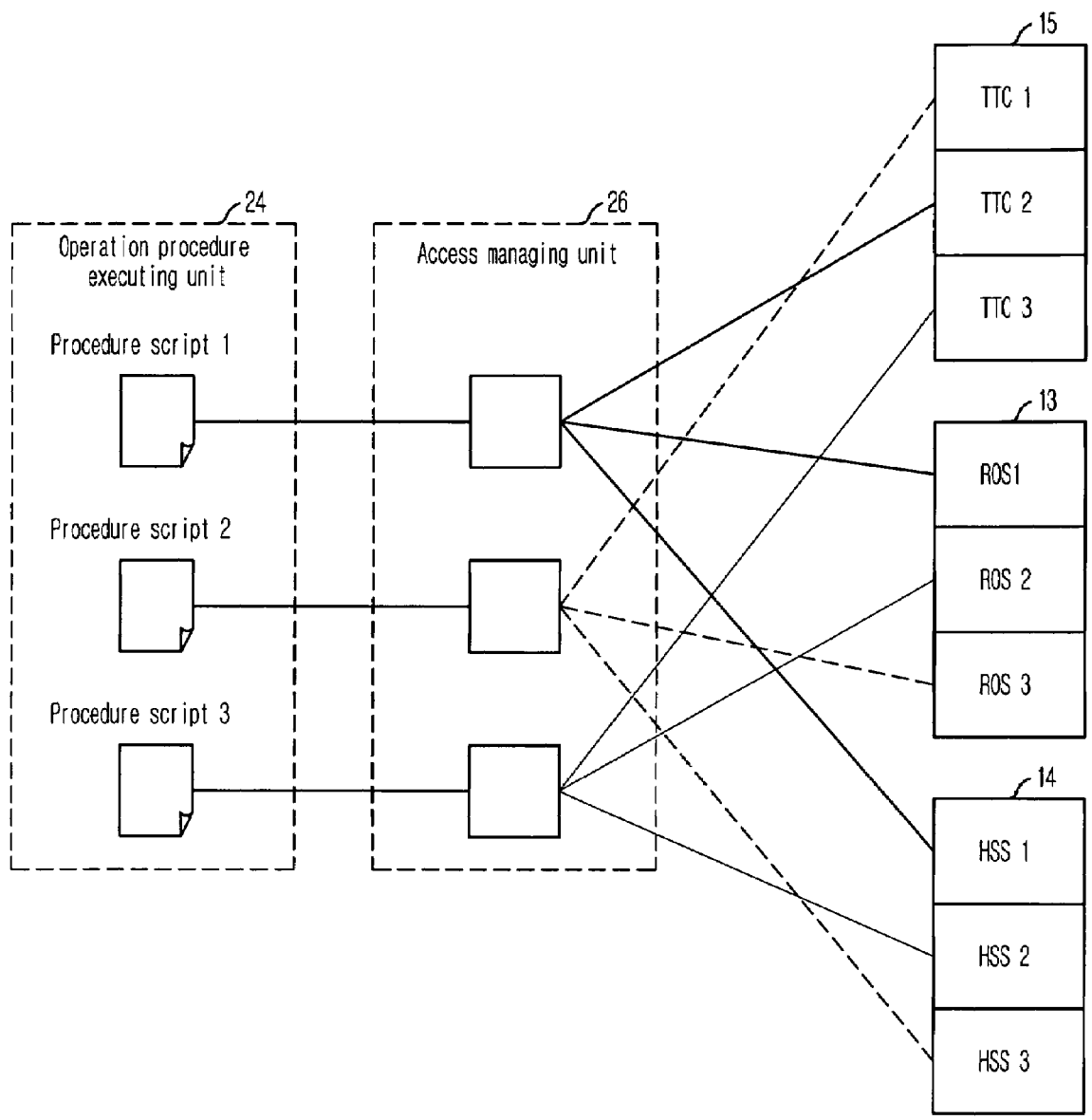
FIG. 6 is a diagram showing interface for automatic multi-satellite ground control in accordance with an embodiment of the present invention.

FIG. 6 is a diagram showing interface for automatic multi-satellite ground control in accordance with an embodiment of the present invention.

The operation procedure executing unit 24 can transmit and receive an automatic control command and state information with respect to each subsystem 13, 14 or 15 by allocating the access managing unit 26 to each automatic operation procedure script and making a link between the subsystems of a combination defined in the automatic operation procedure script.

With this structure, a combination of the subsystems 13 to 15 for each automatic operation procedure script is formed and thus the system can automatically control a plurality of satellites simultaneously.

The method of the present invention can be realized as a program and stored in a computer-readable recording medium, such as CD-ROM, RAM, ROM, floppy disks, hard disks, magneto-optical disks. Since the process can be easily implemented by those of ordinary skill in the art, further description on it will not be provided herein.

The technology of the present invention can require a minimum of manpower by minimizing involvement of an operator into the satellite control. It can prevent a mistake made by the operator and makes it possible to control the satellite without an error even when the satellite communication time is short.

Particularly, the technology of the present invention has an effect that it can operate a plurality of satellites automatically in one control system by connecting only equipment, software or a subsystem that is required additionally to operate a newly launched satellite the automatic operation system and authoring an automatic operation procedure for the new satellite in the automatic operation system.

In addition, since the present invention can build up and operate an automatic control system for the new satellite based on the existing satellite ground control system, it can contribute to resource recycling. As it can use the additional equipment and subsystem for the satellite control to control the existing satellites, the satellite ground control system is duplicated naturally, thus increasing applicability.

The present application contains subject matter related to Korean patent application No. 2004-0091936, filed in the Korean Intellectual Property Office on Nov. 11, 2004, the entire contents of which is incorporated herein by reference.

While the present invention has been described with respect to certain preferred embodiments, it will be apparent to those skilled in the art that various changes and modifications may be made without departing from the scope of the invention as defined in the following claims.

What is claimed is:

1. An automatic operation system (AOS) for automating satellite mission control, comprising:
    a mission timeline receiving means for receiving a mission timeline;
    an operation procedure editing means for authoring an operation procedure script for remotely controlling subsystems based on a process state of a software module of each subsystem for satellite operation by being informed from the mission timeline receiving means that the mission timeline is received and inquiring into an automatic operation procedure script database;
    an operation procedure analyzing and code transforming means for analyzing an automatic operation procedure of the operation procedure script and transforming the automatic operation procedure and telecommands into execution codes based on a telecommand database;
    an operation procedure executing means for transmitting automatic control commands to subsystems and remotely operating the automatic control commands based on time and execution conditions specified in the automatic operation procedure which is transformed into the execution codes;
    a subsystem process state monitoring means for monitoring the process state of a software module of a subsystem to be controlled based on the automatic operation procedure, providing information related to selection of the subsystem that can be used for automatic control to the operation procedure editing means, collecting state information on the state of the automatic operation procedure executed in software modules of the subsystems, and providing the state information to the operation procedure executing means; and
    an access managing means for providing interface with each of the subsystems.

2. The system as recited in claim 1, wherein the operation procedure executing means further includes a function of executing a plurality of automatic operation procedure scripts independently;
    the access managing means further includes a function of providing interface with a subsystem selected in an automatic operation procedure script allocated to each operation procedure executing means based on each automatic operation procedure script; and
    the operation procedure executing means is combined with the access managing means to thereby control a plurality of satellites.

3. The system as recited in claim 1, wherein the operation procedure editing means authors an automatic operation procedure script for controlling software modules operated in a real-time operations subsystem (ROS), a hybrid simulator subsystem (HSS), and a telemetry, tracking and command subsystem (TTC) by inquiring into the automatic operation procedure script database and using a graphic processing language.

4. The system as recited in claim 3, wherein the subsystem process state monitoring means monitors waiting, execution, and error states of all software processes operated in the ROS, the HSS, and the TTC, and monitors the state of hardware equipment that forms the TTC.

5. The system as recited in claim 1, wherein the operation procedure analyzing and code transforming means compiles the automatic operation procedure script authored in graphic processing language and the telecommands of the mission timeline into binary codes based on the telecommand database to transform the automatic operation procedure script authored in the graphic processing language and the telecommands of the mission timeline into execution codes.

6. The system as recited in claim 3, wherein an operation procedure script to be authored in the operation procedure editing means includes a starting part, a unit task part, divergence part and an ending part in the form of graphic icons; and the unit task is provided with a pre-arranged condition checking function which includes a starting time and a starting condition, a task execution function in charge of initializing, executing and ending a task, and an execution result checking function for checking a condition for successful task execution, ending the unit task, and transferring into a next unit task; and the operation procedure script authored in the operation procedure editing means can call sub procedures in the task execution function and defines a detailed execution method through an editor based on each graphic icon.

7. A method for automating operation of a satellite ground control system, comprising the steps of:
    a) receiving a mission timeline, authoring an operation procedure script for remotely controlling subsystems based on the process operation state of a software module of each subsystem for operating a satellite' by inquiring into an automatic operation procedure script database;
    b) analyzing an automatic operation procedure of the operation procedure script and transforming the automatic operation procedure and telecommands into execution codes;
    c) transmitting automatic control commands to subsystems and remotely operating the automatic control commands based on time and execution conditions specified in the automatic operation procedure which is transformed into the execution codes; and
    d) monitoring execution state of the automatic operation procedure.

8. The method as recited in claim 7, wherein, in the step c), an operation procedure executing unit executes a plurality of automatic operation procedure scripts independently;
    an access managing unit provides interface with a subsystem selected in an automatic operation procedure script allocated to each operation procedure executing unit based on each automatic operation procedure script; and
    the operation procedure executing unit is combined with the access managing unit to automatically operate a plurality of satellites in one satellite ground control system.

9. The method as recited in claim 7, wherein the operation procedure script authored in the step a) includes a starting part, a unit task part, divergence part and an ending part in the form of graphic icons; and the unit task is provided with a pre-arranged condition checking function including a starting time and a starting condition, a task execution function in charge of initializing, executing and ending a task, and an execution result checking function for checking a condition for successful task execution and ending the unit task, and transferring into a next unit task; and the operation procedure script authored in the step a) can call sub-procedures in the task execution function and defines a detailed execution method through an editor based on each graphic icon.

10. An automatic satellite ground control system, comprising:
   a flight dynamics subsystem (FDS) for estimating an event generated in operation of a satellite by estimating a change in an orbit and position of the satellite;
   a mission planning subsystem (MPS) for generating a conflict-free mission timeline upon receipt of an event estimated in the FDS and a mission execution request from the satellite;
   a real-time operations subsystem (ROS) for transmitting telecommands to the satellite and receiving telemetry from the satellite;
   a hybrid simulator subsystem (HSS) for describing a change in the orbit and position of the satellite based on a scenario and describing a response of the satellite with respect to the telecommands and related telemetry;
   a telemetry, tracking and command subsystem (TTC) for directly communicating with the satellite wirelessly through a satellite antenna by modulating or demodulating a signal; and
   an automatic operation system (AOS) for monitoring operation state of the ROS, the HSS and the TTC, authoring an automatic operation procedure script, automatically operating a subsystem corresponding to the automatic operation procedure script, and transmitting a telecommand.

11. The system as recited in claim 10, wherein the AOS brings on an automatic operation procedure from an automatic operation procedure script database, stores an authored operation procedure script in the automatic operation procedure script database, adds a mission timeline generated in the MPS to the authored automatic operation procedure script, and transforms telecommands defined in the mission timeline into execution codes by inquiring into a telecommand database.

12. The system as recited in claim 11, wherein the AOS receives a satellite mission timeline from the MPS to automatically operate the satellite ground control system, collects information on operation state of software modules of the ROS, the HSS and the TTC by being interfaced with the ROS, the HSS and the TTC, and operates the satellite ground control system without any involvement of an operator by transmitting an automatic operation control command and telecommand data to the software modules; and
   the automatic operation procedure script database stores an automatic operation procedure script pre-authored based on an operation scenario and the stored automatic operation procedure script can be called and reused in the automatic operation system.

* * * * *